US010061184B2

(12) United States Patent
Harden (10) Patent No.: US 10,061,184 B2
(45) Date of Patent: Aug. 28, 2018

(54) MOUNTING SYSTEM WITH BREAK AWAY INTERFACE

(71) Applicant: Kenneth Harden, Eden Prairie, MN (US)

(72) Inventor: Kenneth Harden, Eden Prairie, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 15/415,326

(22) Filed: Jan. 25, 2017

(65) Prior Publication Data

US 2018/0210324 A1 Jul. 26, 2018

(51) Int. Cl.
| | |
|---|---|
| *G03B 17/12* | (2006.01) |
| *G03B 17/56* | (2006.01) |
| *F16M 13/02* | (2006.01) |
| *F16B 1/00* | (2006.01) |
| *G03B 11/04* | (2006.01) |
| *G03B 11/00* | (2006.01) |
| *G03B 17/06* | (2006.01) |

(52) U.S. Cl.
CPC .............. *G03B 17/566* (2013.01); *F16B 1/00* (2013.01); *F16M 13/02* (2013.01); *F16B 2001/0035* (2013.01); *G03B 11/00* (2013.01); *G03B 11/04* (2013.01); *G03B 17/06* (2013.01); *G03B 17/12* (2013.01); *G03B 17/56* (2013.01)

(58) Field of Classification Search
CPC ..................................................... G03B 17/12
USPC ............................ 396/544; 248/177.1, 181.2
See application file for complete search history.

(56) References Cited

U.S. PATENT DOCUMENTS

| | | | | | |
|---|---|---|---|---|---|
| 3,724,344 | A | * | 4/1973 | Shono ...................... | G03B 9/70 362/10 |
| 3,823,411 | A | * | 7/1974 | Hasegawa ................ | G03B 7/16 396/233 |
| 4,740,804 | A | * | 4/1988 | Shands ................... | G03B 15/03 248/182.1 |
| 5,267,880 | A | * | 12/1993 | Tamm .................... | H01R 13/68 439/620.29 |
| 5,954,446 | A | * | 9/1999 | Ireland ..................... | B23K 9/32 403/11 |
| 6,334,474 | B1 | | 1/2002 | Rababy et al. | |
| 7,986,804 | B2 | | 7/2011 | Linn et al. | |
| 9,664,983 | B2 | * | 5/2017 | Qingyuan ............ | G03B 17/566 |

(Continued)

*Primary Examiner* — Clayton E LaBalle
*Assistant Examiner* — Kevin Butler
(74) *Attorney, Agent, or Firm* — Tysver Beck Evans, PLLC (57) ABSTRACT

A mount for joining a base object to an ancillary object is provided. The mount includes a top layer, a bottom layer, a key, a lock and a collar. The top layer is engaged to the ancillary object and the key extends therefrom. The bottom layer is engaged to the base object. The lock is a recess defined by the bottom layer and has a shape complimentary to that of the key such that the lock and key are mechanically and removeably engaged to one another. The collar extends from a top end to a bottom end. The top end is fixedly engaged to the top layer and the bottom end is fixedly engaged to the bottom layer. The collar is disposed about the lock and the key. The mount may be configured for electrical and mechanical communication and may include an interface for communication with a camera hot shoe.

8 Claims, 9 Drawing Sheets

(56) References Cited

U.S. PATENT DOCUMENTS

| | | | | |
|---|---|---|---|---|
| 2008/0260371 A1* | 10/2008 | Hughes | ............... | G03B 15/05 396/155 |
| 2008/0298793 A1* | 12/2008 | Clark | ............... | H04N 5/2256 396/57 |
| 2010/0060771 A1* | 3/2010 | Shintani | ............... | G03B 13/02 348/333.01 |
| 2010/0060775 A1* | 3/2010 | Shintani | ............... | H04N 5/2252 348/335 |
| 2010/0073507 A1* | 3/2010 | Honjo | ............... | G03B 17/14 348/222.1 |
| 2012/0154665 A1* | 6/2012 | Kaga | ............... | G03B 13/02 348/335 |
| 2012/0189292 A1* | 7/2012 | Kim | ............... | G03B 15/03 396/198 |
| 2012/0315029 A1* | 12/2012 | Ryu | ............... | G03B 15/05 396/542 |
| 2014/0009671 A1* | 1/2014 | Ozone | ............... | H04N 5/2251 348/371 |
| 2015/0013812 A1 | 1/2015 | Bosio et al. | | |
| 2015/0135855 A1* | 5/2015 | Mokhbery | ............... | G01L 3/14 73/862.08 |
| 2016/0124291 A1* | 5/2016 | Qingyuan | ............... | G03B 17/566 396/439 |
| 2017/0085771 A1* | 3/2017 | Schwager | ............... | G01S 13/867 |

* cited by examiner

MOUNTING SYSTEM WITH BREAK AWAY INTERFACE

FIELD OF THE INVENTION

The field of the present disclosure is that of a "break away" interface between devices and/or device components that allows a physical dislocation or disconnection between two previously engaged devices but which maintains their proximity and encourages their reconnection. Some embodiments are directed to a providing a unique mechanical and magnetic interface between any two components or parts of a single component.

Some embodiments include an electrical interface as well. For example, at least one embodiment is specifically concerned with accessories such as flash and lighting assemblies, microphones, etc. and mechanisms for engaging such accessories to a camera or other devices via the camera hot shoe. Embodiments of the disclosure include a unique hot shoe mount that allows the camera component and accessory component to break away from one another while still keeping the two components flexibly attached to one another.

SUMMARY

Embodiments of the disclosure are directed to a two-part linkage or mount for connecting two components or devices at a first rigid mechanical and magnetic interface and at a flexible interface. The mechanical and magnetic interface is in the form of a lock and key type connection between the two components that may "break away" one component from the other such as when one or both components are subjected to sufficient impact or force. The flexible interface is constant and ensures that even when the components are dislocated from one another via the "breaking" of the mechanical and magnetic interface, they remain engaged to one another via a flexible boot or collar disposed about the mechanical and magnetic interface. In some embodiments the collar has elastic or recoil properties to encourage the components to automatically reconnect at the mechanical and magnetic interface if a "breakage" at that interface occurs.

In some embodiments, the interface defines a male to female or lock and key style mechanical interface between two elements, or layers, that define the rigid interface. In some embodiments the layers "snap fit" together.

In at least one embodiment, the mount is configured to communicate with and provide the desired interfaces with a camera and a camera accessory using the at the camera's hot shoe (socket) and the accessory's hot shoe receiver plate.

In some embodiments, the construction of the mount, the manner in which its elements, particularly the flexible collar, interface with the components or devices to which it is engaged may vary depending on the weight of those components, their arrangement and/or orientation, their use and/or the environment in which those components are employed.

DETAILED DESCRIPTION

As mentioned above the embodiments of the present disclosure are directed to an interface mechanism or "mount" for providing a mechanical and magnetic "break away" interface as well as a continuous flexible interface between to components or devices.

Figure 1:
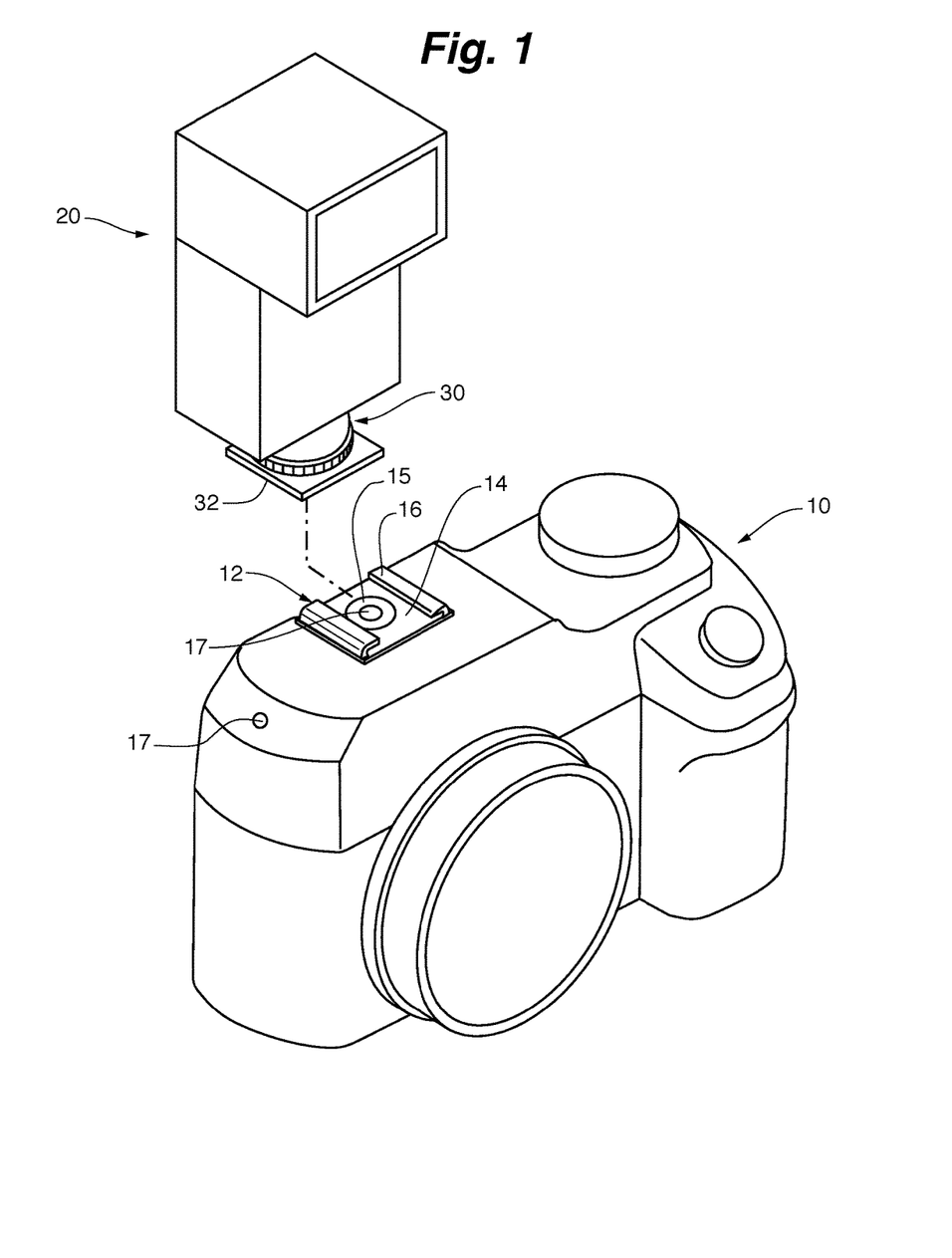
FIG. 1 is a perspective view of the components of a camera and flash being engaged via a hot show and an embodiment of a hot shoe mount located on the base of the flash.

Such devices may for example include electronic devices such as a camera 10 and a camera accessory such as a flash 20, an example of which is depicted in FIG. 1. Camera 10 includes a receiver or hot shoe 12 that provides an engagement mechanism for the removable receipt of a base plate 32 of a hot shoe mount 30, which is in communication with the flash 20.

Camera hot shoes are well known and understood. Hot shoe dimensions and characteristics are described in International Organization for Standardization (ISO) technical report 518:2006, the entire content of which is incorporated herein by reference. The exemplary hot shoe 12, such as is shown and described herein, is a substantially U-shaped bracket comprised of the engagement surface 14 and two opposing flanges 16 for retaining the base plate 32 of the flashes' hot shoe mount 30. While the hot shoe 12 provides an obvious mechanical engagement with the mount 30, in some embodiments the hot shoe 12 provides an electrical interface 15 between the controls of camera 10 and those of the flash 20 so as to provide for flash synchronization, etc.

Figure 2:
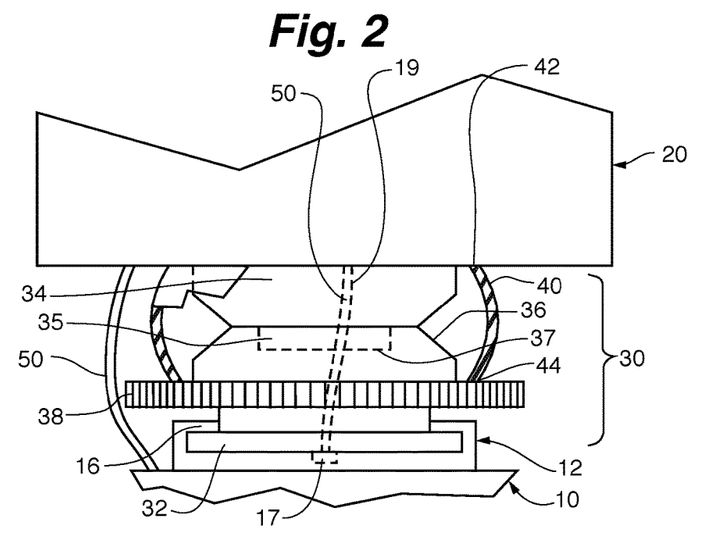
FIG. 2 is a detailed sectional view of an embodiment of the hot shoe mount shown in FIG. 1 in the connected or locked state.
Figure 3:
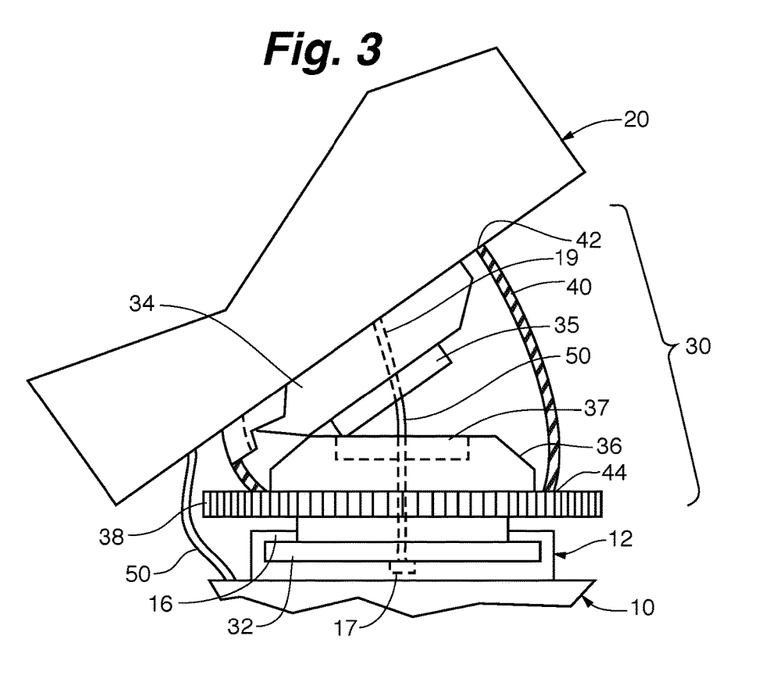
FIG. 3 is a detailed sectional view of the hot shoe mount shown in FIG. 2 in the broken or unlocked state.

In some embodiments, the electronic interface of the hot shoe 12 may include a female outlet port 17 or other type of electronic interface for receipt of a USB, LIGHTNING™, or other type of power/data transmission mechanism such, as a cord 50 suitable for linking the camera 10 to an electronic accessory 20 (examples of cord 50 are illustrated in FIGS. 2 and 3). In some embodiments mount 30 includes a passage or through hole 19 through which the cord 50 passes from the accessory 20 to the camera 10 in the manner shown in FIGS. 2-3.

The outlet 17 may be incorporated into the hot shoe 12 such as in the manner shown in FIG. 1 (and include a cord 50 passing through the hot shoe mount 30 in the manner shown in FIGS. 2 and 3), or may be positioned elsewhere on an external surface of the camera's housing (thus allowing a cord 50, if present, to extend from the flash 20 internally or externally of the hot shoe mount 30).

The hot shoe mount 30 of the flash 20 is a unique mechanism that provides not only for a conventional engagement with the camera hot shoe 12, but also provides a break away feature that allows the flash 20 to temporary be dis-engaged from its electrical interface with the hot shoe 12 while maintaining a physical connection therewith.

This unique mechanism is achieved by providing the mount 30 with a rigid magnetic interface provided by an upper layer 34 and a lower layer 36 of material. Layers 34 and 36 may be of any composition. In an embodiment such as in the flash/camera assembly shown in FIGS. 1-3 mutual stability of the components 10 and 20 may be of extreme value, and thus the layers 34 and 36 are composed of one or more fairly rigid materials. However, in some embodiments, layers 34 and 36 may include vibration dampening materials such as rubberized coatings or other materials.

Figure 4:
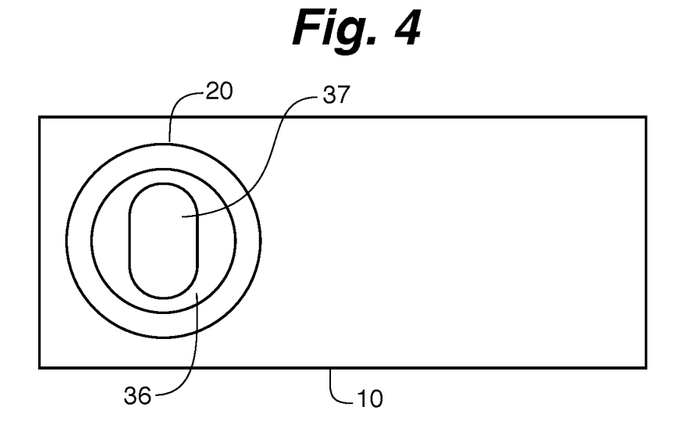
FIG. 4 is a top down view of the lower element of the hot shoe mount shown in FIGS. 2-3.

As shown in FIGS. 2-3 layer 34 defines a protruding key 35 which mechanically engages, in a snap-fit, to a corresponding "lock" (in the form of a hole or recess) 37 defined by layer 36. In at least one embodiment, an example of which is shown in FIG. 4, lock/recess 37 as well as the key 35 (not shown) have a corresponding shape which ensures a desired directional alignment between the flash and the camera when they are engaged. The shape of this alignment key 35 and lock 37 may be of any shape that enforces directional alignment (such as is illustrated in FIG. 1 wherein the camera 10 and flash 20 are aligned in the same direction) between the camera and flash when the layers 34 and 36 are engaged. Such shapes may include the pill-shape shown in FIG. 4. Other shapes may be of any geometric configuration desired such as rectangular, triangular, etc. In embodiments where directional alignment of the joined components is not required the shape of the lock and key may be circular or have some other shape to provide for modifying the alignment between the components in a desired manner.

As previously mentioned the lock 37 and key 35 not only provide a mechanical interface but also a magnetic one. Thus, the materials from which the key 35 is constructed and or at least a portion of the layer 36 which defines the lock or recess 37 are ferromagnetic, or imbued with magnetic properties such that the lock 37 and key 35 are magnetically attracted to one another.

Materials from which the key 35 and/or at least a portion layer 36 that defines lock 37 may be selected from the group consisting of magnetic materials, ferromagnetic metals, neodymium, hardened plastics imbued with magnetic properties (such as those having emeraldine-based polyaniline or tetracyanoquinodimethane, etc.), or combinations thereof.

Returning to the illustrations of FIGS. 2 and 3, it is shown that surrounding the layers 34 and 36, the mount 30 includes an elastic joint or collar 40 that encircles and encloses the magnetic interface of layers 34 and 36. The collar is engaged to and sealed along its top 42 to the base of the flash 20 and at its bottom 44 is engaged and sealed to a mounting or tightening ring 38 of the base plate 32. The tightening ring 38 is engaged to the base plate 32 and configured to tighten the base plate 32 against the flanges 16 of the hot shoe 12.

The particular manner and type of engagement between the collar 40 and the adjacent components of the flash 20 and tightening ring 38 may vary. Such mechanisms may include the use of chemical adhesives, mechanical devices such as fasteners, clamps, biasing members or a combination thereof; affixed between, against or through the top 42 and flash 20 and the bottom 44 and tightening ring 38 respectively. What is of importance, is that the connection of the collar 40 between the flash base and the tightening ring is secure to the extent that the collar 40 maintains its connection between the flash 20 and tightening ring 38 even when a force is applied to the camera/flash assembly sufficient to "break" the mechanical and magnetic interface of the key and lock layers 34 and 36 connection such as in the manner shown in FIG. 3.

Collar 40 may be of any flexible material sufficient to allow the "break" of the rigid interface between layers 34 and 36 while retaining the connection between the flash 20 and tightening ring 38 as depicted in FIG. 3. In some embodiments the collar is also sufficiently elastic so as to provide the mount 32 with the tendency to pull or bias the camera/flash assembly back into proper interface between the lock 37 and key 35 of the layers 36 and 34, such as in the manner shown in FIG. 2.

Some example materials from which the collar 40 may be constructed include but are not limited to: synthetic and/or natural rubber, nylon woven fabric, Neoprene, silicone, thermoplastic polymers and any combinations thereof.

As described, collar 40 provide a mechanism that prevents or substantially reduces occurrences of accidental removal or disconnection of the flash 20 from the camera 10 when either are incidentally impacted, dropped or merely mishandled. The nature of the collar 40 also acts to ensure that such disconnection of components is minimal and temporary. In some embodiments where the collar 40 is substantially solid (lacking holes or provided with a weave or porosity that prevents particles from passing therethrough), the collar 40 also provides a protective barrier around layers 34 and 36 thereby ensuring that their key and lock interface is free of debris and thus always capable of providing a consistent and uniform connection therebetween.

Figure 5:
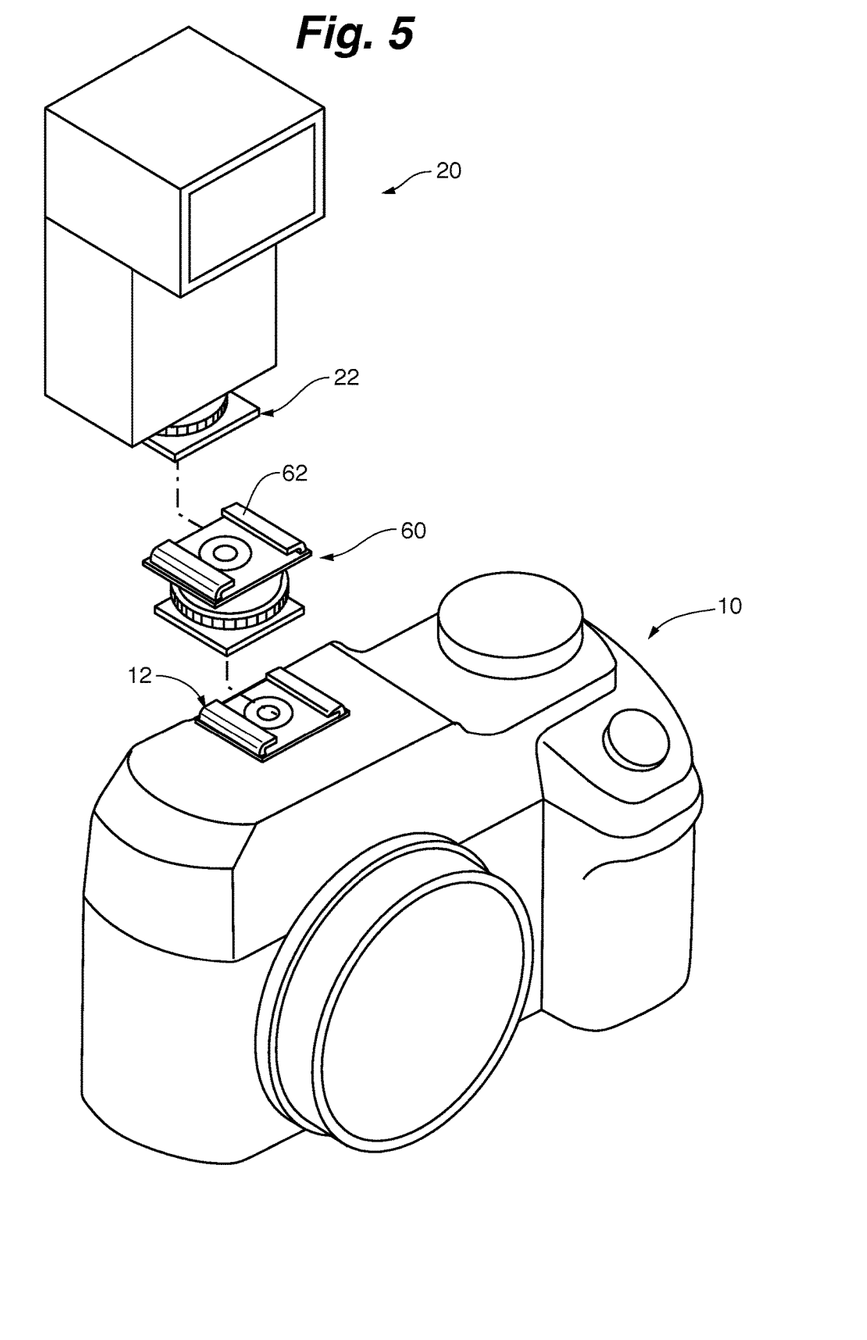
FIG. 5 is a perspective, component view of a camera and flash assembly wherein an embodiment of the hot shoe mount is provided separately from either the camera or flash but may be connected to both so as to provide for their engagement to the camera's hot shoe.

Turning now to FIG. 5, here an embodiment is shown wherein the hot shoe mount 60 is a device separate from the flash or other accessory and capable of acting as a universal connector between two devices (such as a camera 10 and flash 20) with hot shoe or hot shoe-like mounts in the following manner:

In the embodiment shown, the hot shoe mount 60 is configured to interface with a hot shoe 12 of an electronic device such as a camera 10 is provided with in the same manner as previously described. The mount 60 is also configured to interface with a hot shoe mount base plate 22 of a flash or other accessory 20 in the manner shown in FIG. 5.

To accomplish this interface and joining of the components 10 and 20, the mount 60 is configured as an extension of the camera hot shoe 12 such that it includes a hot shoe adapter 62 (of the same type and configuration as the hot shoe 12 of the camera 10 shown in FIGS. 1-3) adapted to receive the base plate 22 of the flash 20 in the manner shown.

Figure 6:
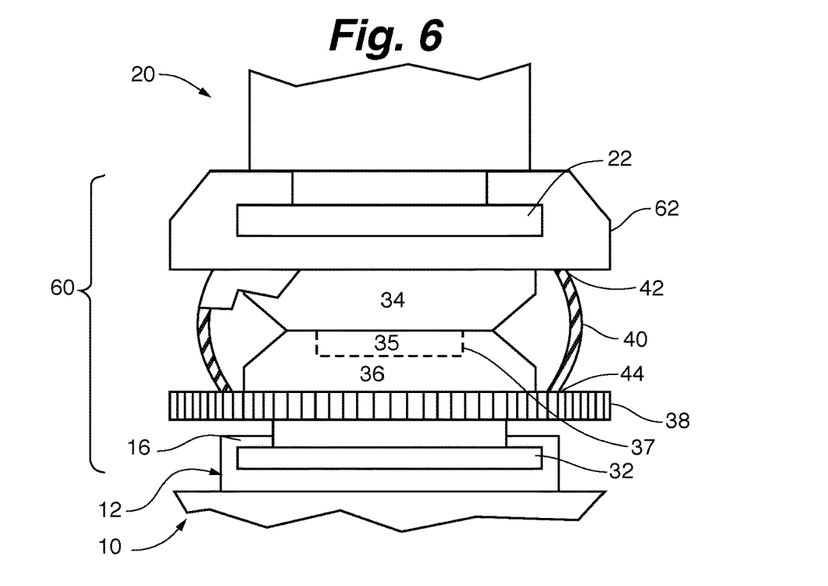
FIG. 6 is a detailed sectional view of the embodiment of the hot shoe mount shown in FIG. 5 in the connected or locked state.
Figure 7:
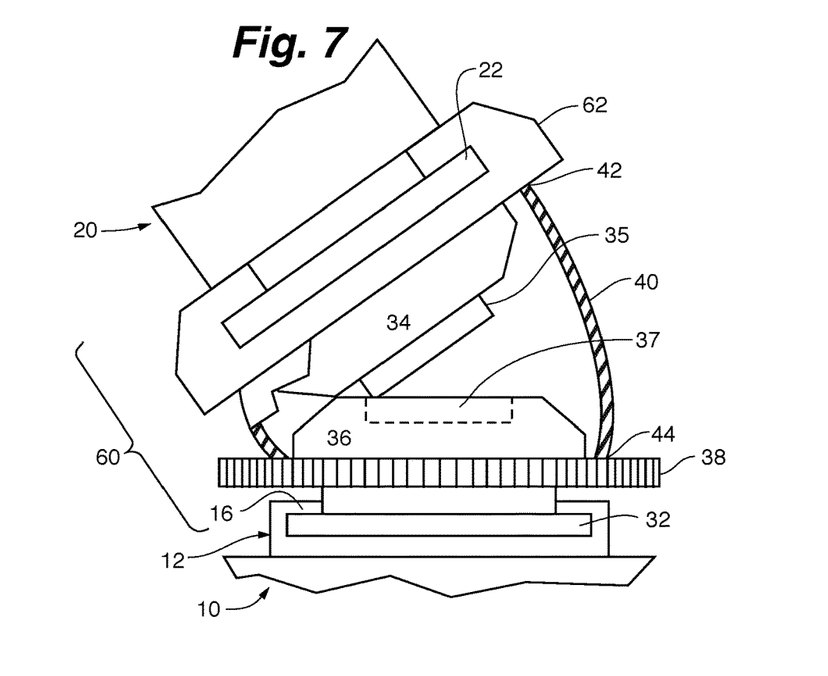
FIG. 7 is a detailed sectional view of the embodiment of the hot shoe mount shown in FIG. 5 in the broken or unlocked state.

A significant distinction over a conventional hot shoe adapter is shown in FIGS. 6-7, wherein the key layer 34 such as has been previously described, is a part of the hot shoe adapter 62 or engaged thereto by any mechanism desired. The remaining components of the mount 60 shown in FIGS. 5-7 are the same as that of the mount 30 shown and described above in FIGS. 1-4; with the top 42 of the collar 40 being engaged and sealed against the hot shoe adapter 62 rather than the base of the flash 20 such as in the previously described embodiment.

Thus, the hot shoe mount 60 is distinct and separable from any and both components 10 and 20 which is designed to join into an assembly. Such an embodiment allows the mount 60 to be used with a wide variety of components; being limited only to those components including a base plate 32 and hot shoe 12 respectively. Any two appropriately equipped components—be they electronic or otherwise—may thus be formed into a unitary assembly having the unique 'break away' connection described above.

Mount 60 provides electrical communication therethrough in the same manner as a conventional hot shoe. Connectivity is maintained via the interface of the component 20 mounting plate 22 with the hot shoe adapter 62, and through layers 34 and 36 (which include or are composed of electrically conductive materials or define electronic pathways therethrough), and finally by the interface of the mounting plate 32 and hot shoe 12 of the component 10. As with the embodiment shown in FIGS. 2 and 3, embodiments of the mount 60 shown in FIGS. 5-7 may include a through passage 19 and outlet port 17 such as are shown therein, to allow components 10 and 20 supplemental or direct electrical connection and communication through the mount 60.

As has been mentioned above, in some embodiments, the mount of the present disclosure is not limited to its use as part of a camera and flash assembly, nor is it limited to providing its unique two-part break away and continuous flexible joining mechanisms exclusively to those joined devices having hot shoe-type assemblies such as has been described and shown in FIGS. 1-7. Rather, in some embodiments, a mount 70 having the desired mechanical and magnetic break away interface as well as the continuous flexible interface may be provided to any two devices or components in a more generic manner such as is depicted in FIGS. 8-11.

Figure 8:
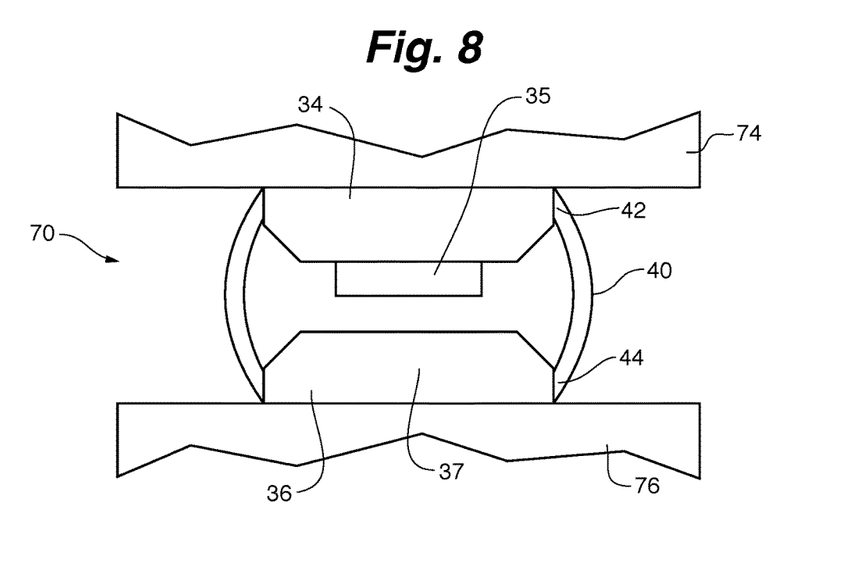
FIG. 8 is a side view of an alternative embodiment wherein a mount is shown for generic light duty use.

A first example of a more generic linkage assembly is shown in FIG. 8. Here an embodiment of the mount 70 is shown joining a base component, device, or object 76 to an ancillary or protruding component, device or object 74. As with the embodiments described above, the magnetic and rigid interface is comprised of two layers of material 34 and 36. Layer 34 includes a protrusion or "key" 35 and layer 34 define a recess or "lock" 37. Key 35 and lock 37 have a corresponding size and shape which ensures a secure fit therebetween and a rigid interface between layers 34 and 36. Key 35 and lock 37 are or include magnetic materials to provide a magnetic attraction therebetween.

In the embodiment shown, layers 34 and 36 may be an aspect of the component 74 and 76 respectively or they may be distinct structures that are fastened, glued, or otherwise engaged to the objects to which they are immediately adjacent. For example, in one embodiment, base component 76 is a surface to which a protruding object, such as a smart phone holder 74 is to be joined. Layer 36 may be adhesively bonded or otherwise secured to the surface 76. Layer 34 may be a protrusion of the smart phone mount 74 or may likewise be a separate mounting surface bonded or otherwise secured to the smart phone holder 74. This is merely an example to illustrate that the layer 34 and object 74 may be elements of the same structure or distinct from one another, as too is the case with layer 36 and object 76.

As with other embodiments, the mount 70 is provided with a flexible collar or boot 40 which surrounds the layers 34 and 36. As shown, the collar 40 is secured to the layers 34 and 36 in any manner desired. In at least one embodiment the collar 40 is chemically bonded to the layers 34 and 36 at its top 42 and bottom 44 respectively through the use of an adhesive. In some embodiments, the surfaces 42 and 44 are secured to the layers 34 and 36 through mechanical fasteners, or other mechanism as described in greater detail below.

In at least one embodiment, the layers 34 and 36 as well as the collar 40 are a unitary structure of the same composition.

In the embodiment shown, the collar 40 is configured for "light duty" use and may thusly be comprised of one or more correspondingly light duty materials such as fairly thin elastic materials including natural or synthetic rubber, vinyl and the like. A light duty embodiment may be one in which the collar 40 is subjected to not significantly more than 10 lbs. of force when the ancillary component 74 is separated from the base component 76 when and if the interface of the lock 37 and key 35 is in the broken or separated state.

Figure 9:
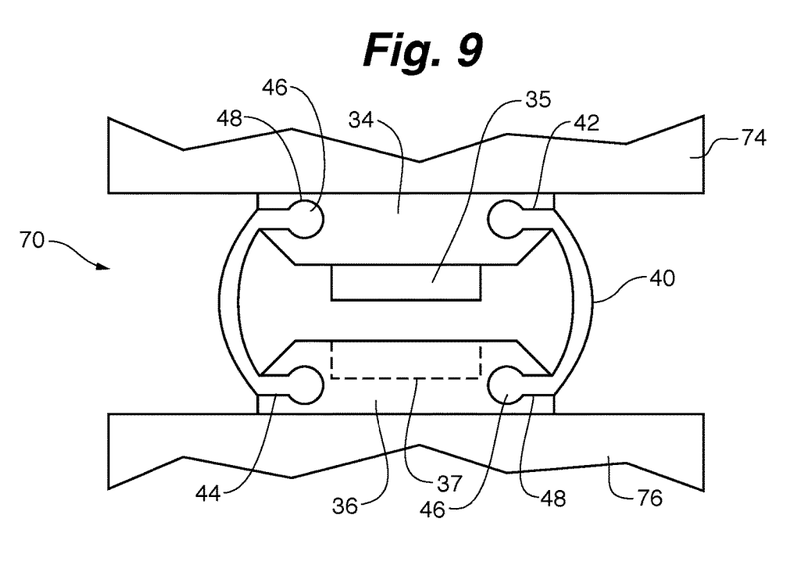
FIG. 9 is a side view of an embodiment of the mount configured for medium duty use.

In another embodiment, shown in FIG. 9, the mount is configured for medium duty use in providing an interface between base component 76 and ancillary component 74. A medium duty use is one in which the collar 40 is subjected to not significantly more than 50 lbs. of force when the ancillary component 74 is separated from the base component 76 when and if the interface of the lock 37 and key 35 is in the broken or separated state. In such medium duty embodiments, collar 40 would typically be comprised of materials similar or the same as in light duty embodiments but be of a greater thickness and durability to provide the necessary performance characteristics.

Some example embodiments of a medium duty mount 70 is one wherein the base component 76 is a vehicle, and ancillary component 74 is a rear view or side view mirror. Other embodiments include those for joining heavier electrical components, signage of appropriate weight criteria affixed to posts or other mounting surfaces, etc.

As is illustrated the medium duty mount 70 includes a collar 40 whose top 42 and bottom 44 are formed to include enlarged or bulbous retaining protrusions 46 which are secured within a correspondingly shaped receiving channel 48 defined by each of the layers 34 and 36. Protrusions 46 are frictionally engaged and retained within the channels 48 in a tongue-and-groove style arrangement to provide the collar with an additional form of engagement over that shown in the light duty embodiment of FIG. 8. In the medium duty embodiment shown in FIG. 9, the ends 42 and 44 (including but not limited to the protrusions 46) of the collar 40 may also be adhesively engaged to the respective layers 34 and 36 within the channels 48 and/or externally therewith.

Figure 10:
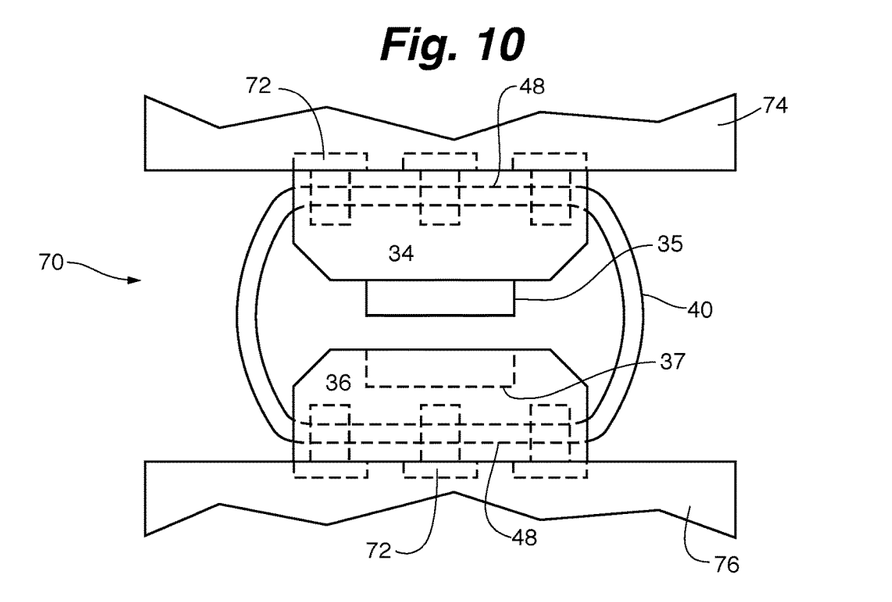
FIG. 10 is a side view of an embodiment of the mount configured for heavy duty use.

In a heavy duty embodiment, an example of which is shown in FIG. 10, the collar 40 in more akin to a hollow sphere of material (or may in fact be a sphere or other enclosed geometric shape of material defining a hollow center) which completely encircles or encloses the lock 37 and key 35 components. In the embodiment shown, layers 34 and 36 define channels or spaces 48 which allows the collar 40 to pass in order to fully encompass the lock 37 and key 35 interface. In some embodiments one or both of layers 34 and 36 are of a two-part construction to form the "bread" of a sandwich wherein a portion of collar 40 is held therebetween.

In some embodiments layers 34 and 36 may include fasteners 72 such as bolts, screws or similar devices to provide additional securement between the layers 34 and 36 and the collar 40. In at least one embodiment, fasteners 72 may also be utilized to engage the top layer 34 to the ancillary object 74 and the bottom layer 36 to the base object 76. Such fastener may pass through the collar 40 to provide still another engagement and retaining mechanism to secure the collar 40 to the layers 34 and 36 but also to the ancillary and base objects 74 and 76 in a more unitary manner.

In a heavy duty embodiment, such as that shown in FIG. 10, the collar 40 is comprised of any suitable flexible material capable of sustaining weights of greater than 50 lbs. when the ancillary object 74 is dislocated from the base object 76 via disconnection of the key 35 and lock 37 in the manner previously described. Some examples of suitable materials include reinforced elastic materials such as natural or synthetic rubbers reinforced with steel fibers or braids, metal weaves, or other materials of appropriate physical property to allow for the "break away" interface of the lock 37 and key 35 to function but retain the objects 74 and 76 together via the collar 40 in both the locked and unlocked states.

Figure 11:
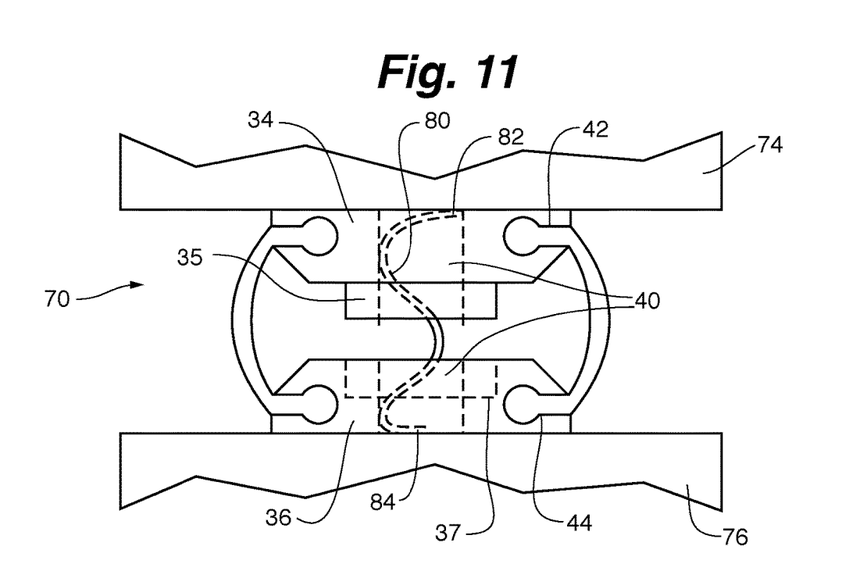
FIG. 11 is a side view of an embodiment wherein the mount is equipped with a retaining cord.

In another embodiment, an example of which is shown in FIG. 11, an additional retaining device is provided to the mount 70 in the form of a retaining cord 80. Cord 80 may be employed by any form of the mount 30, 60 or 80 described herein.

Cord 80 may be a flexible and/or elastic wire, chain, braid, filament etc. In some embodiments the cord 80 may be inelastic and merely have a length sufficient to allow the "break away" functioning of the lock 37 and key 35 and the re-engagement thereof in the manner previously described. The cord 80 includes ends 82 and 84 that may be connected respectively to the ancillary object 74 and base object 76 in any manner desired. In some embodiments, the cord 80 passes through passage 19 such as has been previously shown and described in FIGS. 2-3. Alternatively, the cord 80 may be external to the layers 34 and 36, as well as the lock 37 and key 35. In some embodiments the ends 82 and 84 of the cord 80 are secured to the layers 34 and 36 respectively.

As indicated cord 80 provides another mechanism for insuring that the components 74 and 76 stay secured to one another even when the lock 37 and key 35 are dislocated or separated by force. Cord 80 in effect acts as a back-up or additional securement mechanism over the collar 40, in the event of the structural integrity of the collar 40 failing or that of its securement at its ends 42 and/or 44.

In at least one embodiment, a mount is provided with only a cord 80 and does not include the presence or use of a collar.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A mount for joining a base object to an ancillary object, the mount comprising:
    a top layer, a bottom layer, a key, a lock and a collar, the key and the lock being magnetically attracted to one another;
    the top layer fixedly engaged to the ancillary object by chemical bonding, mechanical engagement and any combination thereof, wherein the key is a protrusion extending from the top layer;
    the bottom layer fixedly engaged to the base object by chemical bonding, mechanical engagement and any combination thereof, wherein the lock is a recess defined by the bottom layer, the key and lock having a complementary shape such that the key is mechanically and removeably engaged by the lock, and provides a directional alignment between the base object and the ancillary object;
    the collar extending from a top end to a bottom end, the top end being fixedly engaged to the top layer, the bottom end being fixedly engaged to the bottom layer, the collar being disposed about and enclosing the lock and the key, the collar constructed from at least one material of the group consisting of: synthetic rubber, natural rubber, nylon, woven fabric, Neoprene, silicone, thermoplastic polymers and any combination thereof.

2. A first electronic device having a hot shoe mount engaged thereto, the hot shoe mount comprising:
    an upper layer of material engaged to the first electronic device, the upper layer of material defining a protrusion, the protrusion having a size and shape;
    a lower layer of material, the lower layer of material defining a recess, the recess having a size and shape corresponding to the size and the shape of the protrusion, the protrusion being removeably received by the recess, the protrusion and the recess being magnetically attracted to one another;
    a base plate, the base plate configured for receipt by a hot shoe of a second electronic device, the base plate having a tightening ring adjacent thereto for securing the base plate to the hot shoe;
    a flexible collar, the flexible collar having a top and a bottom, the top being engaged to the first electronic device, the bottom being engaged to the tightening ring, the collar enclosing the upper layer of material and the lower layer of material; and
    an electronic transmission mechanism located within the hot shoe of the second electronic device, the second electronic device comprising an electrical interface for receipt of the electronic transmission mechanism.

3. The device of claim 2, wherein at least one of the protrusion and the lower layer of material defining the recess are constructed of magnetic material.

4. The device of claim 2, wherein the shape of the protrusion and recess provides a directional alignment.

5. The device of claim 2, wherein the electronic transmission mechanism is a cord, the hot shoe mount defining a passage through which the cord extends from the first electronic device to the second electronic device.

6. The device of claim 5, wherein the cord is a USB cord, and the electrical interface is an outlet port for receipt of the cord.

7. The device of claim 2, wherein the collar is constructed from at least one material of the group consisting of: synthetic rubber, natural rubber, nylon, woven fabric, Neoprene, silicone, thermoplastic polymers and any combination thereof.

8. A first electronic device having a hot shoe mount engaged thereto, the hot shoe mount comprising:
    an upper layer of material engaged to the first electronic device, the upper layer of material defining a protrusion, the protrusion having a size and shape;
    a lower layer of material, the lower layer of material defining a recess, the recess having a size and shape corresponding to the size and the shape of the protrusion, the protrusion being removeably received by the recess, the protrusion and the recess being magnetically attracted to one another;
    a base plate, the base plate configured for receipt by a hot shoe of a second electronic device, the base plate having a tightening ring adjacent thereto for securing the base plate to the hot shoe;
    a flexible collar, the flexible collar having a top and a bottom, the top being engaged to the first electronic device, the bottom being engaged to the tightening ring, the collar enclosing the upper layer of material and the lower layer of material; and an electronic transmission mechanism located on an external surface of the second electronic device displaced from the hot shoe, the second electronic device comprising an electrical interface for receipt of the electronic transmission mechanism.

\* \* \* \* \*